April 19, 1938.  M. E. HENNING  2,114,739
AUTOMATIC CONTROL SWITCH
Filed Jan. 23, 1933
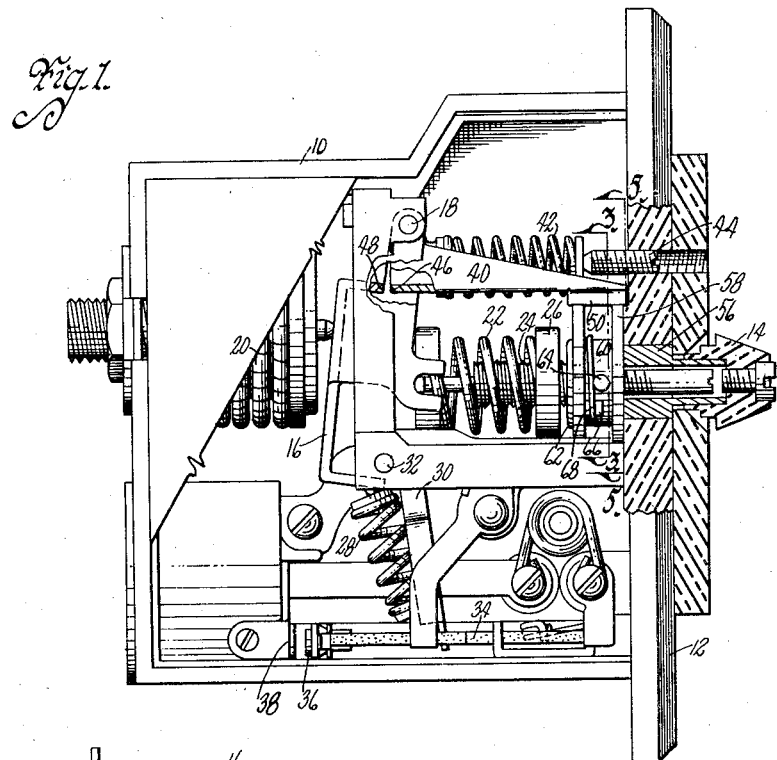
Inventor
Malcolm E. Henning
by Bair, Freeman & Sinclair
Attorneys
Witness
Edw. Seeley Patented Apr. 19, 1938

2,114,739

UNITED STATES PATENT OFFICE 2,114,739

AUTOMATIC CONTROL SWITCH

Malcolm E. Henning, Des Moines, Iowa, assignor to Penn Electric Switch Co., Des Moines, Iowa, a corporation of Iowa Application January 23, 1933, Serial No. 653,093

10 Claims. (Cl. 200—83)

One object of my present invention is to provide an automatic control switch with defrosting mechanism which is simple, durable and inexpensive from a manufacturing and assembling standpoint.

An additional object is to provide for use with an automatic control switch, means for prolonging one of the cycles of operation thereof so that when the control switch, for instance, is used for automatically controlling an electrically operated refrigerator, the means can be set for prolonging one of the de-energized cycles to thus permit an increase above normal of the temperature of the refrigerator for defrosting the cooling unit thereof, the control switch involving a spring loading feature which can be adjusted for predetermining the prolongation of the de-energized cycle.

A further object is to provide means for modifying the operation of a control switch through either a single cycle of operation or through any number of cycles, determined by the time period between two manual settings of the mechanism.

Still a further object is to provide means for modifying one of the cycles of operation of the control switch, such means comprising a control mechanism and means for spring loading it in one direction until a predetermined movement has occurred, whereupon the device is automatically unloaded and permits the control mechanism to re-continue its normal automatic operation, the mechanism being adjustable so that if desired, the spring loading can continue each cycle of operation until it is selectively restored to unloading position.

Still a further object is to provide a differential adjusting or modifying means for a control switch which is controlled by a knob or the like having three different positions, one to cause a modifying action each cycle of operation of the control switch, another to restore the switch to normal position after it has been adjusted for the modifying operation and a third to cause the modifying operation to occur for only a single cycle of operation after the control knob has been moved to the first mentioned position.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of a control switch with defrosting mechanism embodying my invention associated therewith, part of the cover plate being removed from the casing and parts of the mechanism being shown in section to better illustrate it.

Figure 2 is a front elevation of the switch structure showing it in a horizontal position as usually installed instead of in the vertical position of Figure 1.

Figure 3 is a sectional view on the line 3—3 of Figure 1.

Figure 4 is a similar sectional view showing the parts in another position.

Figure 5 is a sectional view on the line 5—5 of Figure 1; and

Figure 6 shows a part of Figure 1 in section.

On the accompanying drawing, I have used the reference numeral 10 to indicate a control switch casing. The face plate thereof is indicated at 12 and a control knob 14 extends through the face plate.

The switch structure to which I apply my defrosting mechanism is of the general temperature actuated automatic type and includes briefly the following elements. A switch arm 16 is pivoted at 18. It is operated by a bellows 20 which is opposed by a spring 22.

The spring 22 is adjusted by turning the knob 14, which in turn rotates an adjusting screw 24 having a cup-shaped nut 26 threaded thereon.

The switch arm 16 is connected by an over-center spring 28 with a secondary switch arm 30 pivoted at 32. The outer end of the switch arm 30 imparts sliding movement to a bar 34 carrying a movable contact 36. The contact 36 is adapted to engage and disengage a stationary contact 38 for making and breaking an electric circuit through the motor, for instance, of an electric refrigerator, the bellows 20 being responsive to the temperature of the refrigerator.

My defrosting mechanism operates on the differential increasing principle and includes a resisting member 40 pivoted on the pin 18. The resisting member 40 is biased toward one position by a spring 42. The tension of the spring 42 may be adjusted by a screw 44 whereby an increase in tension increases the differential.

The resisting member 40 has a shoulder 46 adapted to engage a shoulder 48 of the switch arm 16 under certain conditions. Normally these shoulders are spaced from each other so that the resisting member does not affect the operation of the switch arm 16.

The resisting member 40 has a flange 50 riding on the periphery of a cam 52. The cam 52 has a notch 54 into which the flange 50 can drop, as shown in Figure 3, when the cam is rotated to the proper position.

When the flange drops into the notch, then the shoulder 46 is in position to be engaged by the shoulder 48 after the switch arm 16 moves from the open circuit position shown in Figure 1. Upon such movement, the tension of the spring 42 is added to the tension of the spring 22, thus requiring greater expansion of the bellows 20 to effect closing of the switch contacts 36 and 38. This permits the temperature of the refrigerator to rise well above normal before refrigerating operation is again started by closing the circuit of the refrigerator motor, thus causing defrosting of the cooling coils of the refrigerator.

The knob 14 is mounted on a sleeve 56 which has a second cam 58 thereon and a hub 60. The hub 60 has a flange 62 to retain the cam 52 and yet permit rotation of the cam relative to the hub 60. The hub 60 is connected with the adjusting screw 24, for instance by a pin 64. The pin 64 also serves the purpose of engaging a pin 66 on the cam 52 when rotated to a certain position. A spring 68 is connected with the pin 66 and its free end engages a rib 70 on the switch casing 10 as shown in Figure 3. The spring 68 tends to rotate the cam 52 in the direction of the arrow a, such rotation being limited by a notch 53 receiving the rib 70.

The second cam 58 has a projection 72 thereon adapted to engage the flange 50 of the resisting member 40 to raise it to the dotted line position of Figure 2.

*Practical operation*

In the operation of the control switch, the knob 14 is used to adjust the range of the switch arm 16 in the ordinary manner. It is also operable to effect the defrosting operation.

For instance, when it is moved to the defrost position of Figure 2, (the arrow b in Figure 3 indicating the direction of movement) the pin 64 engages the pin 66 and moves the cam 52 to the full line position against the tension of the spring 68 to retain the cam 52 in the dotted line position. This permits the spring 42 to cause the resisting member 40 to drop to the full line position so that the shoulder 46 is in position to be engaged by the shoulder 48 during the next expansion movement of the bellows 20. The bellows 20 will move the resisting member 40 to the dotted line position and then when the bellows 20 contracts, the resisting member 40 will again move to the full line position and so on during each cycle of operation as long as the pin 64 remains in the full line position of Figure 3.

This is also illustrated in Figure 4 in which the cam 52 is being held in the full line position of Figure 3 and it will be noted that the flange 50 of the resisting member 40 can be moved back and forth without interference as when a single defrosting cycle of operation is desired as will hereinafter be described.

If it is desired to have but one defrosting cycle of operation, however, the knob 14 can be moved from the defrost position of Figure 2 to any of the numbered positions, depending on the degree of cold desired for the normal operation of the refrigerator. For instance, it may be moved to "4" in which position the pin 64 will assume the dotted line position of Figure 3.

When so adjusted, the member 40 will rise to the dotted line position whereupon the spring 68 will return the cam 52 to the dotted line position of Figure 3 and thereafter the flange 50 will contact with the periphery of the cam 52 instead of dropping into the notch 54. Thus only a single defrosting operation is had and thereafter normal operation is resumed.

If it so happens after the knob 14 is set in the defrost position that it is desirable to reset the switch structure for non-defrosting operation, the lobe 72 of the second cam 58 may be moved to the dotted line position of Figure 5 to raise the flange 50 and thereby release the cam 52 so that it will return to the dotted line position of Figure 3 and defrosting will not occur. The dotted line position of Figure 5 may correspond to some position of the knob 14, for instance "9", so that when moved to "defrost" and then to "9", defrosting will not occur even though thereafter the knob is moved back to some other number.

I have shown and described my differential adjusting mechanism in connection with a refrigerator switch for defrosting operation. It is obvious however that it can be applied to other types of control switches or control devices. A novel control arrangement is provided for adjusting the differential widening means for either a single or multiple number of operations, or for restoring it after it has been set, if desired.

Various changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with an automatically movable member and adjustable means movable to vary the range thereof, mechanism for modifying the cycles of operation of said automatically movable member comprising a resisting member selectively movable to operative position to be engaged by the automatically movable member and thereby resist its movement or to an inoperative position, a releasable latch element and a trip element for said resisting member, said adjustable means being associated with said latch element and said trip element to actuate the latch element to cause said resisting member to assume and maintain said operative position in one position of the adjusting means, then to disassociate said adjusting means from said latch element whereby upon one cycle of said automatically movable member being completed, said latch is released or then to actuate said trip element to cause said resisting member to assume said inoperative position.

2. In combination with an automatically movable member operable through cycles of operation and having adjustable means movable to travel between predetermined limits to change the range thereof, mechanism for modifying said cycles of operation comprising a modifying member selectively movable to operative position to be engaged by the automatically movable member and thereby modify its movement or to an inoperative position, a releasable latch element and a trip element for said modifying member, said adjustable means being associated with said latch element and said trip element to actuate said latch element to cause said modifying member to assume and maintain said operative position repetitively during the cycles of operation of said automatically movable member while said adjusting means is in a position at one limit of its limited path of travel, then to disassociate said adjusting means from said latch element whereby upon one cycle of said automatically movable member being completed, said latch is released or then to actuate said trip element to cause said modifying member to assume said inoperative position.

3. For use with an automatic control device having an alternately oppositely movable member, means to prolong the movement of said movable member in one direction comprising a biased member to be engaged by said movable member, a releasable latch for said biased member and manually operable means operatively connected with said latch to either move it to a non-releasable position whereby to set and retain said biased member in position to be engaged by said movable member during the latter part only of its movement in such direction to continually prolong movement of the movable member during each alternate movement of the movable member until it is reset or to move said latch to a releasable position with said biased member preventing its movement to a released position until said movable member disengages said latch and thereby releases it whereby to cause such prolongation during but one of such movements.

4. For use with an automatic control device having an alternately oppositely movable member, means to prolong the movement of said movable member in one direction comprising a biased member to be engaged by said movable member, a releasable latch for said biased member, manually operable means operatively connected with said latch to move it to a non-releasable position whereby to set and retain said biased member in position to be engaged by said movable member during the latter part only of its movement in such direction to repeatedly prolong movement of the movable member during each alternate movement of said movable member until the manually operable means is reset and selectively operable means to move said latch to a releasable position with said biased member preventing its movement to a released position until said movable member disengages said latch and thereby releases it whereby to restore said movable member to non-prolonged operation after a single one of such movements.

5. For use with an automatic control device having an alternately oppositely movable member, means to prolong movement of said movable member in one direction each movement thereof in said one direction comprising a resisting member, a latch operable to position it in the path of movement of said movable member, said latch being releasable to normally remove it from such path, said latch being biased to such removing position, said resisting member engaging said latch to retain it in position opposite its biased position, said movable member being engageable with said resisting member to disengage it from the latch and selectively operable means to disengage said resisting member from said latch to permit it to respond to its bias and thereby return to its normal position.

6. For use with an automatic control device having an alternately oppositely movable member, means to prolong movement of said movable member in one direction each movement thereof in said one direction comprising a resisting member, a latch operable to position it in the path of movement of said movable member, said latch being releasable to normally remove it from such path, said latch being biased to such removing position, said resisting member engaging said latch to retain it in position opposite its biased position, said movable member being engageable with said resisting member to disengage it from the latch and selectively operable means to retain said latch in position opposing the biasing influence thereon.

7. In a control mechanism, a cyclically movable member normally movable through a given range, a resisting member normally ineffective means operable to move the same from said ineffective position to thereby render it effective to resist movement of the cyclically movable member in one direction, said means comprising a cam having a portion to register with said resisting member to retain it in ineffective position and a detent to register therewith to allow it to assume its effective position, said cam being biased to return said cam to its initial position by disengagement of said resisting member from said detent caused by movement of said cyclically movable member after registration of said detent with said resisting member.

8. In a control mechanism, a cyclically movable member normally movable through a given range, a resisting member normally ineffective, means operable to move the same from said ineffective position to thereby render it effective to resist movement of the cyclically movable member in one direction, said means comprising a cam having a portion to register with said resisting member to retain it in ineffective position and a detent to register therewith to allow it to assume its effective position, said cam being biased to return to its initial position, the cam, after being moved to position with said resisting member, being retained by said cyclically movable member against its bias until said resisting member is moved by said cyclically movable member to disengaged position with relation to said detent.

9. In a control mechanism, a cyclically movable member normally movable through a given range, means for adjusting such range, a resisting member normally ineffective and a single, manually controllable means operable to move the same from said ineffective position to thereby render it effective to resist movement of the cyclically movable member in one direction, said means including a cam having a portion to register with said resisting member to retain it in ineffective position, a detent to register therewith to allow it to assume its effective position, said cam being associated with said adjusting means whereby said detent of said cam registers with said resisting member in one position of the adjusting means and said portion of said cam registers with said resisting member in other positions of the adjusting means and a spring urging said cam from effective toward ineffective position, said manually controllable means, in one position, holding said cam from being acted upon by said spring.

10. In a control mechanism, a cyclically movable member normally movable through a given range, a resisting member normally ineffective and means operable to move the same from said ineffective position to thereby render it effective to resist movement of the cyclically movable member in one direction, said means comprising a cam having a portion to register with said resisting member to retain it in ineffective position, a detent to register therewith to allow it to assume its effective position and a spring urging said cam from effective toward ineffective position.

MALCOLM E. HENNING.